Feb. 19, 1957  C. W. JOHNSON  2,781,787
GATE VALVE
Filed Nov. 24, 1954

INVENTOR.
Clarence W. Johnson
BY Alex. E. MacRae
Attorney.

United States Patent Office 2,781,787
Patented Feb. 19, 1957

2,781,787

GATE VALVE

Clarence W. Johnson, Edmonton, Alberta, Canada

Application November 24, 1954, Serial No. 471,001

2 Claims. (Cl. 138—94.5)

This invention relates to valves, and more particularly to a gate valve.

A general object of the invention is to provide a gate valve, of the mud valve type, which possesses increased simplicity and ruggedness of structure and which is susceptible to economical manufacture.

More specific objects of the invention are to provide a valve which may be quickly and readily installed in a pipe line and removed therefrom, which has a gate structure requiring a minimum of movement to change the valve from shut-off to fully open position, which possesses satisfactorily supported sealing means whereby substantially little leakage occurs during rotation of the gate, and which is of compact size and effective operation under varying conditions.

Figures 1, 2:
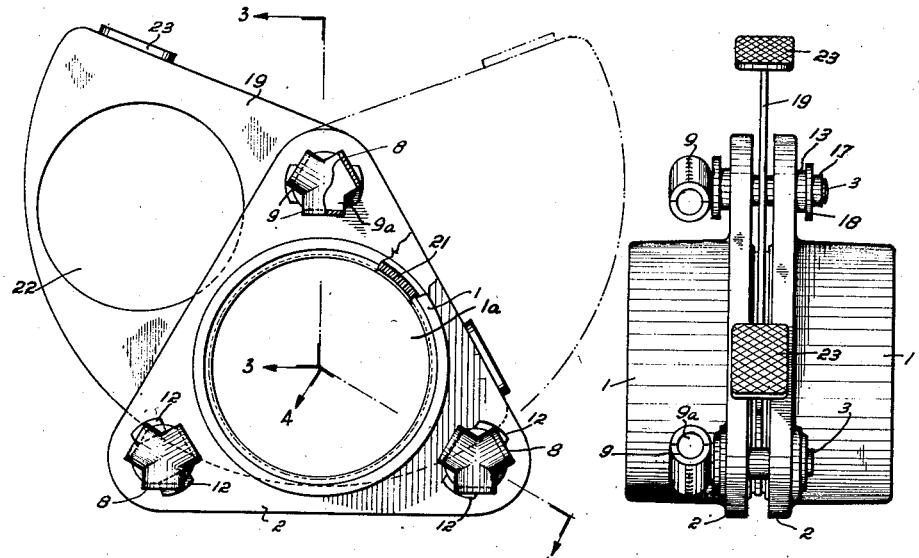
Figure 3:
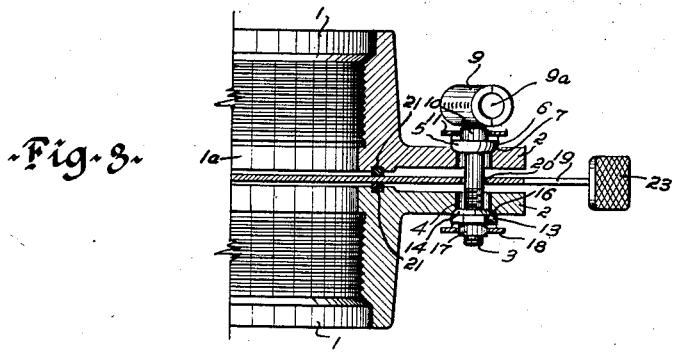
Figure 4:
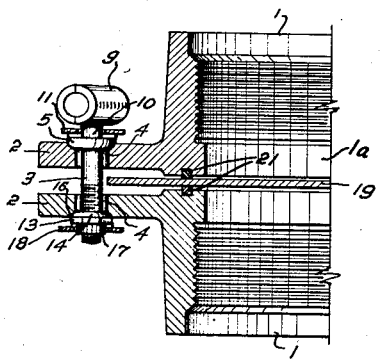
Figure 5:
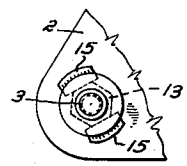

Other objects, details and advantages of the invention will become apparent from the following description, with particular reference to the accompanying drawing, in which Figure 1 is a plan view of one side of a valve in accordance with the invention, Figure 2 is a side elevation, Figure 3 is a partial sectional elevation on line 3—3 of Figure 1, Figure 4 is a partial sectional elevation on line 4—4 of Figure 1, and Figure 5 is a partial plan view of the other side of the valve.

Referring to the drawing, the valve comprises a pair of aligned cylindrical pipe connections 1, which may be threaded as shown for connection to a pipe but which may be welded or otherwise suitably fastened to the pipe in which the valve is to be mounted. Each pipe connection 1 is provided with an outwardly extending equilateral triangular flange 2 adjacent its inner end.

The flanges 2 are secured together by means of bolts 3 which extend loosely through openings 4 in the apex portions of the flanges. Each bolt 3 has a spool 5 fixed to one end portion thereof and having a curved annular surface 6 in seating engagement with a complementary recess 7 extending peripherally around the outer end of opening 4 in one flange. The bolt is also provided with a hollow bolt rotating head 8 spaced from the spool by means of a shank 10. The head 8 comprises three radially directed portions 9 and has an opening 9a between each adjacent pair of portions 9. It will be apparent that the openings 9a provide chordal passages in the head adapted to receive a round bar which may be inserted into or through the head end used as a wrench. As shown, the bar may be inserted from six different positions, thus facilitating operation of the valve in confined spaces. A washer 11 is loosely mounted on shank 10 and is welded to a pair of shoulders 12 carried by the flange.

A nut 13 is threaded on the other end of each bolt 3 and has a curved annular edge surface 14 for seating engagement with a complementary recess 16 extending peripherally around the outer end of opening 4 in the other flange. The nut 13 is restrained from turning movement by engagement of its flat side surfaces with a pair of shoulders 15 carried by the flange. The nut 13 has an annular portion 17 on which is loosely mounted a washer 18. The washer 18 is welded to the ends of shoulders 16.

A gate 19 is pivotally mounted at 20 on one of the bolts 3 between the flanges 2. The gate is in the form of a flat plate of sector-shaped contour. As shown, the section is of approximately 120° and the pivot point 20 is located adjacent the apex of the sector. The gate 19 is spaced from the flanges 2 by means of a pair of oppositely disposed annular sealing gaskets 21 each seated in a complementary groove in a respective flange 2. It will be apparent that each gasket 21 extends peripherally around the pipe communicating passage or opening 1a in the respective pipe connection 1. The gate 19 is provided with a circular hole or opening 22 of approximately the same or slightly greater diameter than that of opening 1a. Opening 22 is located adjacent one side of and in a half portion of gate 19, the other half portion being imperforate. Each flat edge of the gate 19 is provided with a pedal 23, which may be employed to swing the gate from open to closed position or vice versa, and which also acts as a stop for engagement with the edge of flanges 2 to define the open and closed positions of the valve. Operation of the valve by swinging movement of the gate 19 to open or closed position will be apparent from the foregoing description.

It will be apparent that the valve described may be readily inserted in or removed from a pipe. In operation, a minimum arc of movement (approximately 60°) is necessary to change the gate from shut-off to fully open position. As the gate passes from open to closed position, a minimum portion of the sealing gaskets 21 is left unsupported by the gate; hence there is substantially little likelihood of the gaskets coming out of their grooves or of being damaged as the edge of the hole 22 passes between them. It will be observed that the gate is never fully removed from between the gaskets and thus very little leakage occurs during rotation of the gate and no difficulty is experienced in reinserting the gate if the flanges 2 become compressed together by the pipes to which they are attached.

The triangular shape of the valve with its rounded corners make it compact and reduces possibility of bending or damaging of the exposed portion of the gate. Foot operation is facilitated by means of the pedals. Moreover, remote operation is simplified because of the small arc of movement.

The rounded seating faces on the spool 5 and nut 13 avoid bending of the bolt 3 should the flanges be forced into misalignment by the pipes to which they are connected.

The fluid passages of the valve may be the full diameter of the pipe in which the valve is installed and are completely free of axles, shafts, direction changes or large cavities. Some of the benefits of such a feature are (a) minimum resistance to flow, (b) no tendency of the valve to plug when passing fluids containing solids, (c) less possibility of freezing during winter operation, and (d) should freezing in the valve occur, the operating parts, being rugged, may be broken loose without sustaining damage or may be easily heated to melt the ice.

The valve is particularly well adapted for use as a mud valve in oilfields where compactness, rugged construction, and simplicity of operation are of great importance.

I claim:

1. A valve comprising a pair of pipe connections having a passage extending therethrough, each said pipe connection having symmetrically arranged thereon a flange of substantially equilateral triangular contour extending radially outwardly from said passage, means connecting said flanges together comprising a bolt extending through said flanges adjacent each of the three apex portions thereof, said bolt having a spool fixed thereto, said flanges having pairs of registering openings through which said bolts loosely extend, each said bolt having at one end a head for rotating said bolt spool, the spool being adjacent to but spaced from said head, said spool having a curved annular surface in seating engagement with one of said flanges, and a nut threaded on the other end of said bolt and having a curved annular surface in seating engagement with the other of said flanges, a sector-shaped gate swingably mounted on one of said bolts between said flanges and having an opening therein for registry with said passage and an imperforate portion for closure of said passage, and sealing means carried by each flange and in constant engagement with said gate.

2. A valve as defined in claim 1, including a pedal fixed to each side edge of said gate and extending laterally thereof, said pedals engaging the side edges of said flanges to define the open and closed positions of said gate.

References Cited in the file of this patent

UNITED STATES PATENTS

| | | |
|---|---|---|
| 1,352,918 | Rohbock | Sept. 14, 1920 |
| 1,613,138 | Seymour et al. | Jan. 4, 1927 |
| 2,225,153 | Brown | Dec. 17, 1940 |

FOREIGN PATENTS

| | | |
|---|---|---|
| 672,126 | Great Britain | May 14, 1952 |